United States Patent
Arimondi et al.

(10) Patent No.: US 7,212,716 B2
(45) Date of Patent: May 1, 2007

(54) PROCESS FOR MANUFACTURING A MICRO-STRUCTURED OPTICAL FIBRE

(75) Inventors: Marco Arimondi, Pavia (IT); Andrea Macchetta, Milan (IT); Daniela Asnaghi, Milan (IT); Anna Castaldo, Marzano di Nola (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 35 days.

(21) Appl. No.: 10/511,145

(22) PCT Filed: Apr. 16, 2002

(86) PCT No.: PCT/EP02/04203

§ 371 (c)(1),
(2), (4) Date: Jul. 12, 2005

(87) PCT Pub. No.: WO03/086738

PCT Pub. Date: Oct. 23, 2003

(65) Prior Publication Data

US 2005/0286847 A1   Dec. 29, 2005

(51) Int. Cl.
*G02B 6/02* (2006.01)
(52) U.S. Cl. ........................ 385/123; 385/127
(58) Field of Classification Search ............... 385/123
See application file for complete search history.

(56) References Cited

U.S. PATENT DOCUMENTS 5,182,783 A   1/1993   Bosc et al.
5,802,236 A   9/1998   DiGiovanni et al.

(Continued)

FOREIGN PATENT DOCUMENTS

| FR | 2 657 556 | 8/1991 |
| JP | 06-067040 A | 3/1994 |
| WO | WO 99/00685 | 1/1999 |
| WO | WO 00/60388 | 10/2000 |

OTHER PUBLICATIONS

Marcou, J., "Plastic Optical Fibres—Practical Applications", John Wiley & Sons, New York, pp. 8-11, (1997).

(Continued)

*Primary Examiner*—Sung Pak
*Assistant Examiner*—Tina M Wong
(74) *Attorney, Agent, or Firm*—Finnegan, Henderson, Farabow, Garrett & Dunner, L.L.P.

(57) ABSTRACT

An intermediate polymer preform of elongated shape for manufacturing a microstructured optical fibre is made from a mould with a tubular par containing a pattern of hole generating elements (wires, rods or tubes) extending along it. The hole generating elements are releasably attached to an upper and to a lower base of the mould. The mould is cleaned by circulating a filtered solvent in it. The mould is filled with a fluid polymer optical material or polymer precursor. The polymer material or precursor is consolidated so that it cannot change its shape under operating stress conditions at ambient temperature. The hole generating elements are released from the upper and lower base. The consolidated core preform is extracted from the mould. The process can further include calibrating the intermediate preform.

34 Claims, 6 Drawing Sheets

U.S. PATENT DOCUMENTS

| | | | |
|---|---|---|---|
| 5,935,491 A | | 8/1999 | Tripathy et al. |
| 6,091,872 A | | 7/2000 | Katoot |
| 6,334,019 B1 | | 12/2001 | Birks et al. |
| 6,594,429 B1 | * | 7/2003 | White ........................ 385/124 |
| 2003/0190130 A1 | * | 10/2003 | Welker et al. .............. 385/126 |

OTHER PUBLICATIONS

Choi, J. et a., "Fabrication and Properties of Polymer Photonic Crystal Fibers", Proceedings POF2001, Amsterdam, NL, pp. 355-360, (Sep. 27-30, 2001).

Van Eijelenborg, M. A. et al., "Microstructured Polymer Optical Fibre", Optics Express, vol. 9, No. 7, pp. 319-327, (Sep. 24, 2001).

* cited by examiner

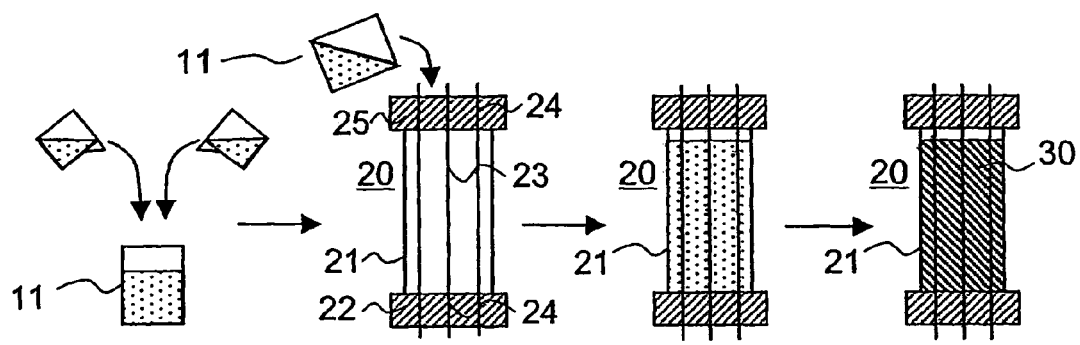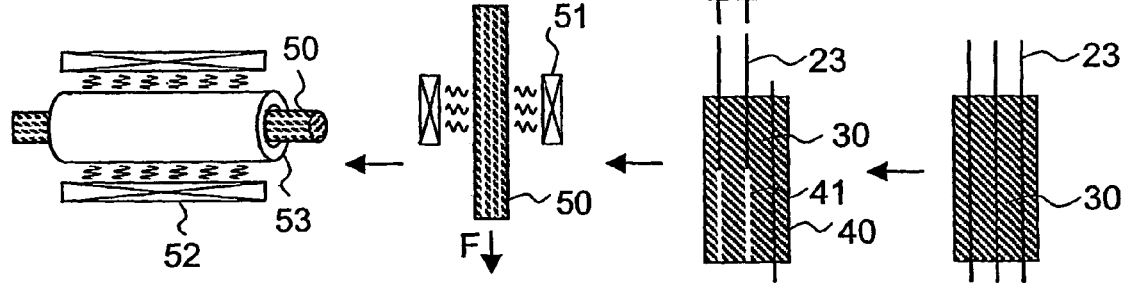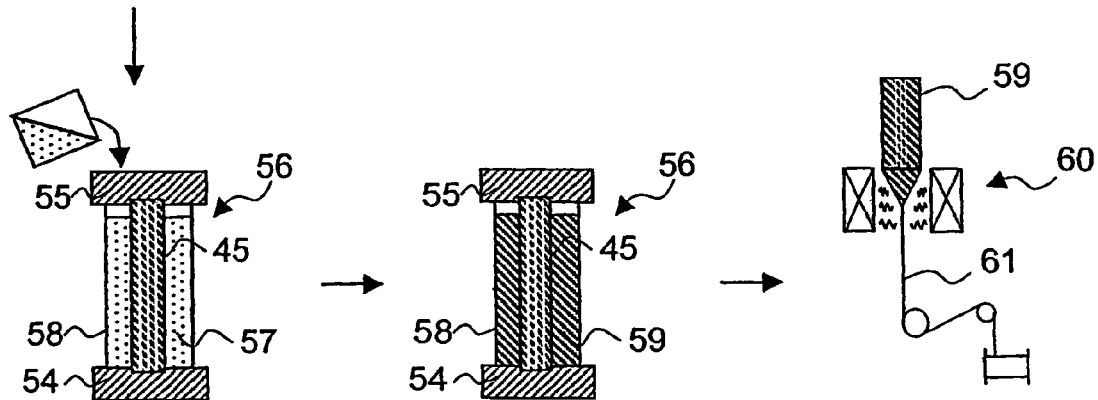

PROCESS FOR MANUFACTURING A MICRO-STRUCTURED OPTICAL FIBRE

CROSS REFERENCE TO RELATED APPLICATION

This application is a national phase application based on PCT/EP02/04203, filed Apr. 16, 2002, the content of which is incorporated herein by reference.

BACKGROUND OF THE INVENTION

1. Field of the Invention

This invention relates to a process for manufacturing a micro-structured optical fibre and to a method for producing a structured intermediate preform to be used in such a process.

2. Description of the Related Art

Optical fibres are used for transmitting light from one place to another. Normally, optical fibres are made of more than one material. A first material is used to form a central light-carrying part of the fibre known as the core, while a second material surrounds the first material and forms a part of the fibre known as the cladding. Light can become trapped within the core by total internal reflection at the core/cladding interface.

A more recent type of optical fibre waveguide, having a significantly different structure from that of conventional optical fibres, is the micro-structured fibre (also known as "photonic crystal fibre" or "holey fibre"). A micro-structured optical fibre is a fibre made of a same homogeneous material (typically silica), having inside a micro-structure (i.e. a structure on the scale of the optical wavelength) defined by micro-structural elements extending longitudinally along the fibre and having a predetermined distribution. As a micro-structural element it is possible to identify a micro-hole or a filiform element of a different material than the bulk.

The most common type of micro-structured optical fibre has a cladding region showing a plurality of equally-spaced tiny holes, surrounding a homogeneous and uniform central (core) region. A fibre of this type is described, for example, in international patent application WO 99/00685. In a different embodiment, the central region of the fibre may have a central hole, as described, for example, in international patent application WO 00/60388.

These two types of fibres convey light in the core according to different optical phenomena.

In the absence of a central hole, propagation of light in the cladding region is forbidden due to the presence of a lowering of the average refractive index with respect to the core region. Such a structure forms a low-loss all-silica optical waveguide that, for appropriate parameters, remains single-mode for all wavelengths within the transmission window of the silica. The waveguiding mechanism in that case is closely related to that in conventional optical fibres and is a form of total internal reflection between two materials (air and silica) having different refractive indexes.

In order to achieve light propagation in a central hole, the "photonic band-gap" effect, as induced by the presence of a periodic array of holes in the cladding region, is exploited. The "photonic band-gap" phenomenon, which is analogous to the "electronic band-gap" known in solid-state physics, avoids light of certain frequencies to propagate in the zone occupied by the array of holes, this light being therefore confined in the core region. Propagation of light in fibres showing a photonic band gap is described, for example, in already cited WO 00/60388.

Optical characteristics of the above-described microstructured fibres depend on the number of holes, the holes diameter, the distance between adjacent holes and the hole geometrical pattern. Since each of these parameters can broadly vary, fibres of very different characteristics can be designed.

It has been shown that, by properly adjusting the ratio between hole diameter d and hole-to-hole distance $\Lambda$, single mode or few mode behaviour over a wide wavelength range can be obtained.

Micro-structured optical fibres are typically manufactured by the so-called "stack-and-draw" method, wherein a number of solid and hollow rods are stacked inside a hollow glass cylinder, so as to constitute an array with the same structure as that of the final fibre. The stacked rods are then welded together, and the preform so obtained is drawn by conventional methods, producing the fibre.

In U.S. Pat. No. 5,802,236A for example, a core element (e.g., a silica rod) and a multiplicity of capillary tubes (e.g., silica tubes) are provided, and the capillary tubes are arranged as a bundle, with the core element typically in the centre of the bundle. The bundle is held together by one or more overclad tubes that are collapsed onto the bundle. The fibre is then drawn from the thus prepared preform.

The Applicant has noted that the stack-and-draw manufacturing method has several drawbacks.

Assembling a large number of very thin canes (defined by rods or tubes) is an awkward operation. Also it is likely to generate interstitial cavities due to stacking and drawing of cylindrical canes. This may affect dramatically the fibre attenuation by introducing impurities, undesired interfaces and inducing a reshaping or deformation of the starting holes. Other problems of the stack-and-draw method may be represented by the low purity of the tubes and/or rods materials and by the difficulties in producing tubes and/or rods of the required shapes (in particular, in the case of hexagonal bodies) and dimensions and in obtaining the required pattern of holes (due for example to the difficulty in realizing geometries different from triangular when positioning rods and tubes in close-packed arrangement). Moreover, the relatively low productivity and high cost make this method less than optimal for industrial production.

The Applicant further observes that the stack-and-draw method for fabricating a holey optical fibre has the drawback that the holes and the core dimensions in the final fibre are limited by the inner and outer diameter of the tubes and rod employed in the assembly.

Polymeric optical fibres (POFs) are known as a promising alternative to glass fibres, in particular for short distance applications, in view of their low cost, ease of connectorization, and flexibility. Ordinary polymer fibres have a relatively large core. This causes the fibres to guide a very high number of transverse modes, with significant limitations to the available bandwidth.

Recently, a number of papers concerning microstructured polymeric fibres have been presented.

M. A. van Eijkelenborg et al., *Microstructured Polymer Optical Fibre*, Optics Express, Vol. 9, No. 7, 24 Sep. 2001, pp. 319–327, disclose a polymer-based microstructured fibre that is single moded at optical wavelengths. According to the authors, polymer preforms, in addition to the capillary stacking technique, can be made using techniques such as extrusion, polymer casting, polymerisation in a mould and injection moulding. Different cross sections of the preform can be obtained, with holes of arbitrary shapes and sizes in any desired arrangement. A large range of polymers is available for microstructured polymer optical fibres, including condensation polymers, catalytically formed polymers, biopolymers, sol-gel polymers and chain addition polymers.

The paper does not disclose details of the preform production process. The authors, during a post-deadline oral presentation at the POF2001 conference, Amsterdam, NL, Sep. 27–30, 2001, mentioned the technique of casting around plastic capillaries that exploits the low processing temperatures of polymers. As disclosed in J. Choi, D. Y. Kim, U. C. Paek, *Fabrication and Properties of Polymer Photonic Crystal Fibers*, Proceedings POF2001, Amsterdam, NL, Sep. 27–30, 2001, pp. 355–360, polymer photonic crystal fibres have been drawn from a polymethylmethacrylate (PMMA) preform. The fibre consisted of a pure PMMA core surrounded by a photonic crystal pattern with air holes of a hexagonal symmetry running along the length of the fibre. For fabrication of the preforms, thermal polymerisation of methylmethacrylate (MMA) is performed. Once the polymerisation is completed, an aging process is conducted in a vacuum oven with reduced pressure for 12 hours, then the temperature is slowly reduced to room temperature. A fibre is then drawn in a drawing tower while setting the furnace at a temperature of 270° C. A resulting polymer photonic crystal fibre is shown that has a diameter of 190 μM with air hole diameter of about 11 μm and core diameter of 25 μm.

This paper does not disclose details of how the hexagonal hole pattern is impressed in the fibre preform.

JP 6-67040, in the name of The Furukawa Electric Co., discloses the production of a hollow-core plastic optical fibre for endoscopic applications. A hollow preform for drawing such fibre is produced by filling a thermoplastic resin into a cylindrical mould provided with a base and with a cylindrical core protruding coaxially from the mould base. In a different embodiment, the cylindrical core is manufactured as a separate body from the cylindrical mould and is detachably mounted to the mould base. In the reported examples, the cylindrical core had a diameter between 9.5 and 10 mm and was coated with a polytetrafluoroethylene tube, so as to result in a hole diameter between 11 and 13 mm for the preforins. In the drawn hollow core fibres the diameter of the hollow core was between 470 and 530 μm.

SUMMARY OF THE INVENTION

The Applicant has considered a different solution for the production of polymer optical preforms for microstructured optical fibres, since the need to have holes with relatively small diameter in the drawn fibre pushes towards adopting hole diameters generally smaller than 8 mm for the preform. The solution that has been considered involves adopting a mould wherein a number of parallel cylindrical hole generating elements, such as wires, rods or tubes, are attached to the mould base, at positions corresponding to the plurality of holes making up the fibre microstructure. In this case, however, it has been found that the extraction of the preform from the mould is made particularly difficult by the significant adhesion forces that develop in the mould between the preform body and the plurality of hole generating elements.

The applicant has found a solution to this problem by making a mould with an upper and a lower base and a set of hole generating elements that can be releasably attached to the upper and lower base. When using this mould, the polymer preform can be extracted from the container of the mould with the hole generating elements embedded in it, and then the hole generating elements can be extracted from the preform in a separate step, preferably one by one.

According to a first aspect, the present invention relates to a process for forming an intermediate preform for manufacturing a microstructured optical fibre, comprising:

providing a cylindrical mould defining a central axis, the mould comprising a cylindrical container wall, a first base and a removable second base;

arranging within the mould a plurality of hole generating elements, apt to define internal structural elements of the intermediate preform;

inserting a fluid optical polymer material or polymer precursor in the mould;

consolidating the fluid polymer material or polymer precursor so as to obtain a solid cylindrical polymer body defining the intermediate preform and having embedded the hole generating elements.

The hole generating elements are releasably fixed to said first and to said second base and comprise at least one hole generating element removable from the intermediate preform. The invention process further includes:

releasing the hole generating elements from the first and second base;

removing the second base from the mould;

removing the cylindrical intermediate preform from the mould, together with the therein embedded hole generating elements; and removing the removable hole generating element for forming an elongated hole inside the intermediate preform by applying a load to said removable hole generating element.

Such a process allows for total freedom in the design of the microstructure, and does not generate the undesired interfaces typical in the stack-and-draw method. Moreover, the mould can be isolated from external ambient and accurately cleaned by circulating a filtered solvent, so reducing causes of optical scattering. Also, use of a fluid polymer precursor allows careful purification and filtering which turns out in a lower attenuation. Further, the assembly of the mould is much easier and faster than the stacking of canes, and it requires much less elements.

Furthermore, fixing the hole generating elements to both a first and second base, located towards opposite ends of the mould, allows a precise and stable positioning of the hole generating elements and a precise location of the holes throughout the length of the optical preform.

Furthermore the Applicant has noted that the ratio between the diameter d of the holes and the fibre diameter D should preferably be lower than 0.015 and more preferably lower than 0.01 for a microstructured fibre, in order to achieve single mode or few mode guiding over a wide wavelength range for the fibre. As the aspect ratio of the holes and the preform is kept constant to a good approximation during fibre drawing, a mould would be needed for the fibre preform with a ratio of the diameter of the hole generating elements to the internal mould diameter lower than 0.015. This would lead to the use of thin hole generating elements or of large moulds. However, too little dimensions and spacing of the holes makes it very difficult to assemble the mould and to extract from it the hole-generating elements, whereas a too large mould diameter complicates preform post-processing and is likely to cause inhomogeneity in the consolidated core.

Applicant has observed that these problems can be avoided by a process including a first step, to produce a microstructured core preform by consolidation of a fluid optical polymer material or polymer precursor in a mould, and one or more subsequent steps, to reduce the dimension of the core preform and sleeve it, i.e., add new material around it, so as to create a fibre preform with the correct dimensional ratios.

Accordingly, processing of the consolidated core preform can comprise the following operations:
  stretching the core preform and its holes to a dimension lower than the initial one;
  adding new material around the stretched core preform, to decrease the ratio between hole and fibre diameter;
  repeating the above two operations until a preform is obtained with the correct ratio between hole and fibre diameter.

The method adopted for consolidation in a mould and extraction from the mould removes many technical drawbacks of the stack-and-draw method, as the presence of undesired interfaces carrying impurities, whereas the multistep stretching and sleeving procedure allows obtaining small values of the ration d/D by using simple moulds.

Applicant has remarked, however, that it is difficult to achieve in practice a constant and reproducible diameter for the stretched preform resulting from the stretching operation. A diameter variation along a same stretched preform can significantly lower the quality of the optical preforms produced by the process and/or give rise to a large scrap, while a change of diameter from a stretched preform to the next one results in the need of adding material of different thickness to the stretched preforms, in order to reach a target ratio between hole and fibre diameter, this requiring a complicated step of determining the thickness of the new material to be added for each single preform.

Applicant has further remarked that the cooling that follows the stretching operation is likely to generate internal stresses, which can cause damages to the preform in the subsequent operations. This effect can be compensated if the stretched core preform is annealed, by heating it over its glass transition temperature $T_g$ and slowly cooling it down.

It has been found that the annealing operation can be exploited to calibrate the stretched preform, achieving a precision in diameter that is difficult or impossible to obtain by the stretching phase alone.

In greater detail, according to a second aspect, the present invention relates to a process for producing a calibrated intermediate polymer preform for manufacturing an optical fibre, comprising:
  forming an intermediate polymer preform of elongated shape having an elongation axis, the polymer having a predetermined glass transition temperature $T_g$.

The process further includes calibrating the intermediate preform, wherein calibrating comprises:
  stretching the intermediate preform during a stretching period by heating it at a predetermined stretching temperature above $T_g$ and applying a tensional load to the intermediate preform along its elongation axis, so as to cause its straining along the elongation axis, the stretching temperature, the tensional load and the stretching period being selected so as to impress a viscoelastic deformation to the intermediate preform;
  cooling the intermediate preform to a temperature below $T_g$ during a cooling period, while maintaining the stretched preform in tension, so as to avoid a substantial release of said viscoelastic deformation;
  inserting the intermediate preform in a calibration tube having a cylindrical inner shape; and
  heating the intermediate polymer preform to a calibration temperature above $T_g$ during a calibration period sufficient to achieve a substantial release of said viscoelastic deformation.

The invention production process, in particular the calibration process, can produce several stretched preforms from a single intermediate polymer core preform with reduced amount of scrap.

The step of forming an intermediate polymer preform of elongated shape can comprise the following operations:
  inserting a fluid optical polymer material or polymer precursor in a cylindrical mould;
  consolidating the optical polymer material or polymer precursor so as to obtain a cylindrical polymer body defining the intermediate preform; and
  removing the cylindrical polymer body from the mould.

Preferably, the step of forming an intermediate polymer preform of elongated shape comprises the following operations:
  making a mould made of a tubular part containing a pattern of hole generating elements (wires, rods or tubes) extending along it, the hole generating elements being releasably attached to an upper and to a lower base of the mould;
  filling said mould with a fluid polymer optical material or polymer precursor;
  consolidating said material so that it cannot change its shape under operating stress conditions at ambient temperature;
  releasing the hole generating elements from the upper and lower base;
  extracting the consolidated core preform from the mould and, if required, extracting the hole-generating elements from the core preform, in order to create the microstructure.

More preferably the process includes, before filling the mould with a fluid optical polymer or polymer precursor, the step of cleaning the mould by circulating in it a filtered solvent.

Regarding to possible extraction of the hole-generating elements from the core preform, different cases can be singled out:
  the hole-generating elements can remain encapsulated in the core preform. They can be little tubes of the same material as the preform bulk, or solid rods of a transparent material of a different refractive index, in general lower than that of the bulk material;
  the hole-generating elements can be extracted from the core preform after complete material consolidation. The extraction is generally obtained by applying to the element a pulling force, if necessary after heating of the preform or the element itself.

As aforesaid, the choice of the dimensions of mould and hole-generating elements is based on practical considerations of easy handling and processing. In consequence, in general d/D in the core preform can be larger than that needed in the microstructured fibre. One or more subsequent steps are in this case necessary for obtaining a fibre preform with the correct ratio.

These steps can comprise the following operations:
  calibrating the core preform by the invention method to a dimension lower than the initial one;
  adding new material around the stretched core preform, to decrease the ratio between hole and fibre diameter;
  repeating the above operations until the correct dimensional ratio of the fibre preform is reached.

Sleeving, i.e., material addition around the stretched core preform, can be achieved in various ways:
  the stretched preform can be inserted in the middle of a mould, and new material added around it and consolidated;

a tube of the outer material can be prepared with the same or other processes as the core preform, and the stretched core preform inserted in the hollow of the tube, maintained in position by interference, gluing or welding.

It is to be understood that the material added around the stretched core preform may be different from that of the core preform. In general this outer part has the function to protect the core and facilitate handling of the fibre.

Therefore, the outer material has generally less optical purity and higher toughness of the core material.

The procedure described can be repeated several times, until the needed fibre preform is obtained, to be drawn with one of the conventional method for producing optical fibres.

The multi-step procedure allows to obtain any ratios between hole and preform diameters and between hole diameter and hole-to-hole distance, without producing too large preforms, which will be very difficult to draw and likely to be thermally and optically inhomogeneous. Moreover the procedure allows using relatively small quantities of expensive core materials, which could be cost effective.

According to a third aspect, the present invention relates to an optical polymer preform obtained by any of the above described processes.

According to a fourth aspect, the present invention relates to an optical polymer fibre obtained by any of the above described processes.

BRIEF DESCRIPTION OF THE DRAWINGS

Further details may be found in the following description, which refers to the appended figures listed here:

FIGS. 6a to 6m show schematically different steps of the process of the present invention.

DETAILED DESCRIPTION OF THE INVENTION

Fibre Structure

A microstructured plastic optical fibre will be now described. This fibre may have a large effective area and be single-mode or few-mode from the UV to the NIR.

In the following the well-known case of holes disposed on a regular triangular arrangement will be discussed. However, different arrangements can be as easily obtained with the method of the invention.

FIGS. from 1a to 1c illustrate, as an example, three different micro-structured optical fibres, indicated with 1, 1', 1", respectively, which can be obtained by a process according to the present invention, as described in the following.

Figure 1A:
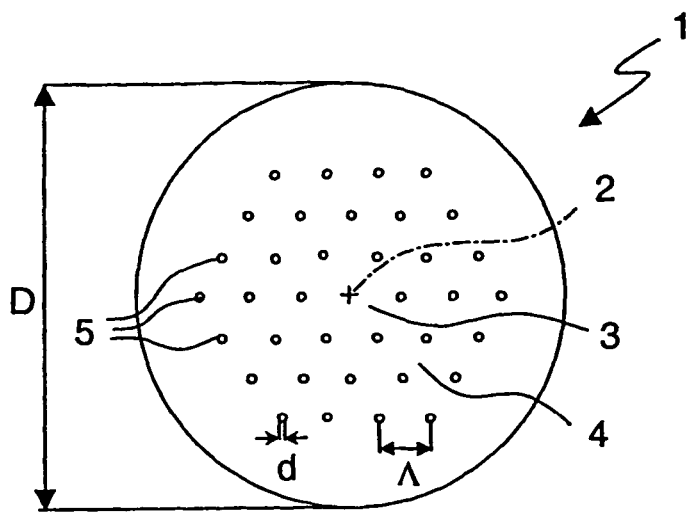
FIGS. 1a, 1b and 1c show three different micro-structured optical fibres.

Fibre 1 (FIG. 1a) has a central axis 2, a central region 3 coaxial to axis 2 and an annular region 4 surrounding the central region 3. Annular region 4 has a plurality of holes 5, which are preferably arranged symmetrically about axis 2 and have typically the same dimension. Holes 5 may also have different dimensions, for example as illustrated in U.S. Pat. No. 5,802,236, wherein the holes of an inner crown (surrounding the central region) have higher dimensions than the more external holes.

Central region 3 is preferably made, in this embodiment, of the same material as the annular region 4; in particular, central and annular regions 3, 4 are, in this case, different portions of a same homogeneous body (apart from the discontinuity represented by holes 5). Central region 3 is void of holes, thus defining a "central defect" in the holey fibre. Holes 5 may contain air or a different gas, or even a suitable vacuum, or may be filled with a liquid or with material that is different from that of the hosting polymer body. If the holes 5 are filled with a different material, this material will typically have a different refractive index than the surrounding material.

Figure 1B:
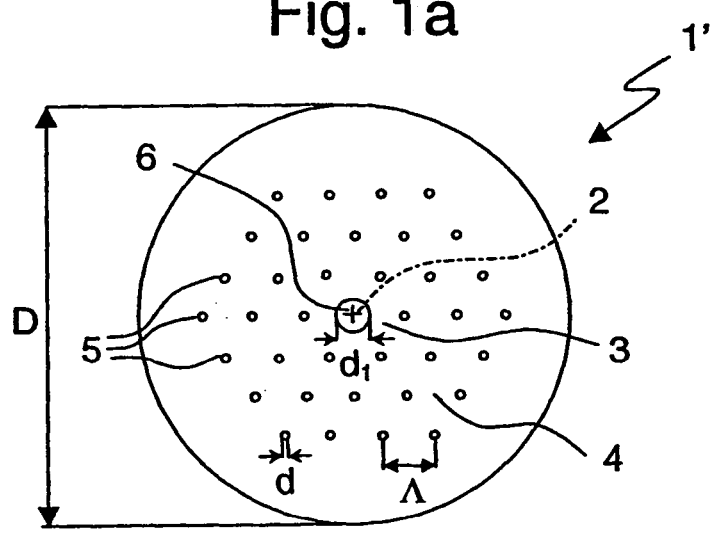
Figure 1C:
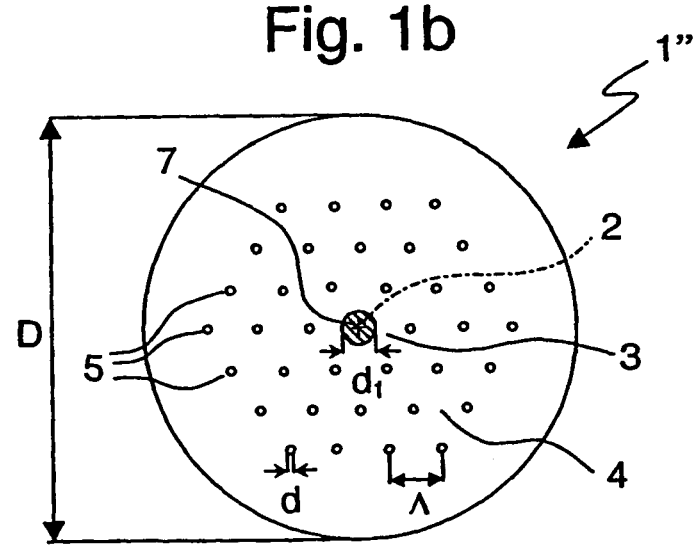

Fibre 1' (FIG. 1b) differs from fibre 1 in that the central region 3 has a central hole 6 coaxial to axis 2, while fibre 1" (FIG. 1c) differs from fibre 1 in that the central region 3 comprises a central micro-structural element 7 of a different material than the material of annular region 4.

Fibres 1, 1' and 1" thus have a plurality of micro-structural elements, which can be defined either by longitudinal holes or by longitudinal portions of a different material than the hosting polymer.

The parameters characterizing the above-described micro-structured fibres are the diameter d of the holes 5, the diameter $d_1$ of the central hole 6 or of the central structural element 7, the spacing (pitch) $\Lambda$ between two adjacent holes 5 and the external diameter D of the fibre. The fibre light propagation properties depend, at a chosen light wavelength $\lambda$, on the ratios $d/\Lambda$ and $\Lambda/\lambda$. Typically, the quantities d and $\Lambda$ are in the micron scale. Fibre diameter D is, for a standard polymer fibre, from 0.250 to 1 mm, preferably between 0.5 and 1 mm. We remark that polymer fibres usually do not need to be coated. Coating is used only with fibres made of expensive materials in which case it is usual to consider the fibre diameter as including the coating diameter. If the diameter d of holes 5 is a sufficiently small fraction of the pitch $\Lambda$, the core 3 of the fibre 1 guides light in a single mode over a wide range of $\lambda$. The ratio $d/\Lambda$ is preferably comprised between 0.1 and 0.5, to achieve single mode or few mode propagation. The ratio $\Lambda/\lambda$ is preferably comprised between 5 and 20, more preferably between 5 and 10. The effective area $A_{eff}$ at a wavelength of 650 nm is preferably greater than 80 $\mu m^2$.

The ratio d/D is preferably comprised between 0.0002 and 0.015, more preferably between 0.001 and 0.01.

EXAMPLE

Two coaxial crowns of holes are arranged around a central defect, consisting of a missing hole. The field amplitude distribution of the fundamental mode has been calculated for this structure by using the values of 1.4892 for the bulk refractive index and 650 nm for the wavelength, both values being typical of polymethylmethacrylate. As an example, the results for $\Lambda=10$ μM ($\Lambda/\lambda=15.4$), and d=1 μm ($d/\Lambda=0.1$) have been evaluated. In these conditions, the 1/e equal intensity line falls inside the solid core, close to the inner crown of holes, and the effective area at 650 nm results as large as 680 $\mu m^2$.

Therefore the connection between fibres of this type is eased. The plastic material is easy to cut and splice; moreover, the large effective area reduces alignment difficulties.

Figure 2:
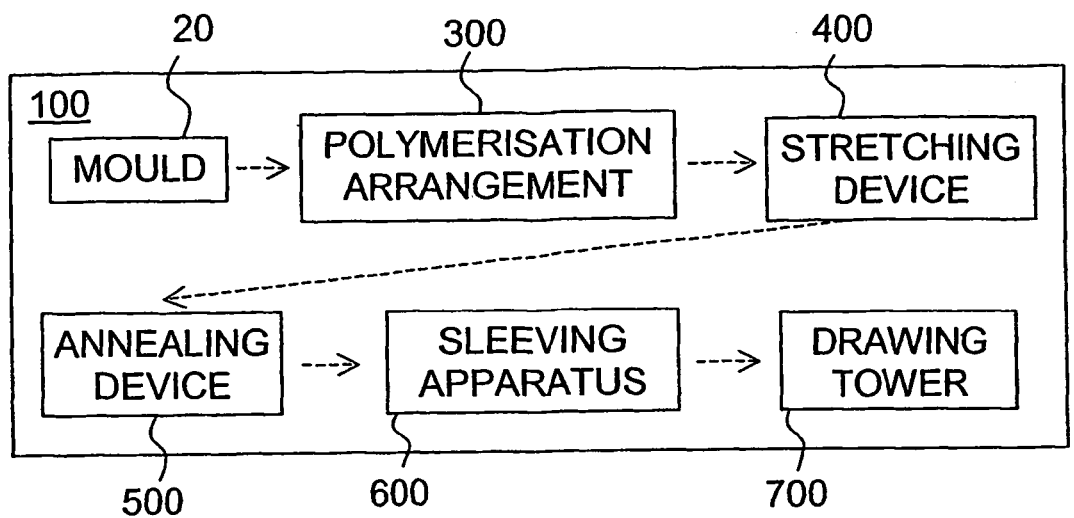
FIG. 2 is a block representation of an assembly for manufacturing a micro-structured polymer optical fibre according to the present invention.

An assembly apt to manufacture micro-structured fibres of the types previously described is schematically depicted in the block representation of FIG. 2 and is here indicated with 100. Assembly 100 comprises a mould 20 for producing a core preform from a polymer precursor, an arrangement 300 for obtaining the polymerisation of the core preform, a stretching device 400 for stretching the core preform, an annealing device 500 for calibrating the stretched core preform into a core rod, a sleeving apparatus 600 for applying an external coating to the core rod thus obtaining a final preform, and a drawing tower 700 for drawing an optical fibre from the final preform. A dashed line shows the sequential order of operation of the different components of assembly 100.

Preform Production

Various embodiments of the invention will be described referring to the case of batch polymerisation of a monomer. The differences from other possible embodiments in which different batch techniques are applied, such as casting of a molten polymer or powder sintering, will be evident to anyone skilled in the art, as well as the technical details which are needed to implement them. In this respect, the invention is general and is not limited to batch polymerisation.

With reference to the schematic representation of FIGS. 6a to 6m, the embodiments described include the following steps.

The process starts (FIG. 6a) with the preparation of a polymer precursor. The purified monomer is mixed (11) with the additives needed to induce and control the polymerisation reaction.

The mixture 11 is introduced (FIG. 6b) into the mould 20, that includes a container 21 closed at its extremities by lower and upper cover 22, 25. The mould contains a set of hole generating elements 23 of appropriate diameter, which pass through holes 24 drilled in the covers according to the required pattern of the microstructured fibre. The elements 23 are maintained straight by some appropriate device, not shown.

The mixture 10 may be poured into mould 20 through an appropriate inlet, not shown, provided on upper cover 25 or on a side of container 21.

The assembly is then sealed and the appropriate temperature and pressure conditions are imposed (FIG. 6c) for the time required by polymerisation to proceed to completion (FIG. 6d).

At the end of the process the polymerised material 30 is extracted from the mould 20 (FIG. 6e).

The hole generating elements 23 embedded in the polymerised material 30 are extracted, if needed, by some appropriate means, obtaining a core preform 40 containing an array of holes 41 (FIG. 6f). In other embodiments of the invention, all the elements 23 or a subset of them may be left inside the core preform 40.

If a multi-step procedure is required, the core preform 40 is stretched by applying a tensile force F at its extremities while heating it in a suitable stretching oven 51 (FIG. 6g), so as to produce a stretched core preform 50. The stretched core preform 50 is reduced to an appropriate dimension, if necessary by application of a calibration step (FIG. 6h) with the aid of a calibration tube 53 and a calibration oven 52. By calibrating stretched core preform 50, a core rod 45 is produced.

New material is added around to the core rod 45, for example by inserting it in a tube. As an alternative, a polymer material or polymer precursor 57 is poured around the core rod in a suitable mould 56, of the same type as mould 20, provided with a container 58 including upper and lower covers 54, 55 (FIG. 6i). The polymer material or polymer precursor is then consolidated (e.g. cooled or polymerised). (FIG. 6l).

The procedure may be repeated until a final fibre preform 59 containing holes with the correct dimensional ratio is obtained.

Finally, the fibre preform 59 obtained with this multi-step procedure is drawn with some conventional method for plastic optical fibres, with a drawing tower 60 including a furnace; obtaining the microstructured fibre 61, as shown in FIG. 6m.

The production steps of the preform according to the invention, outlined above, will be now described in greater detail.

Figure 3:
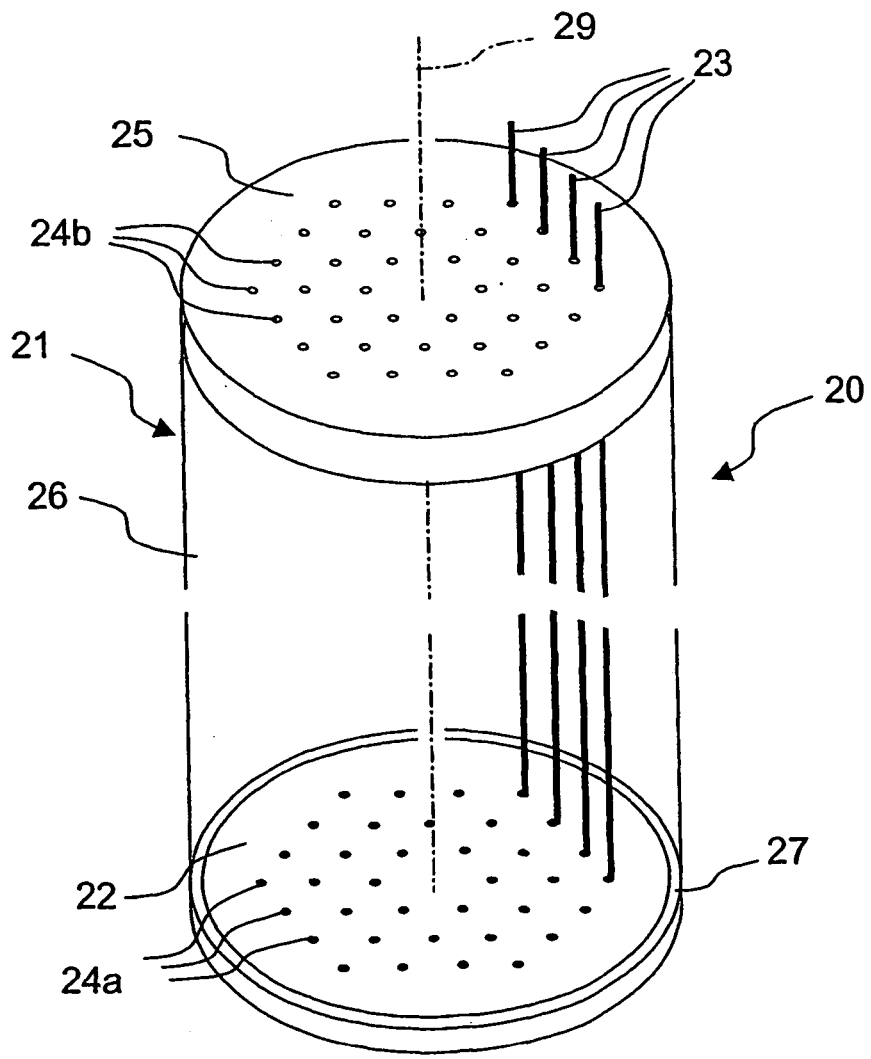
FIG. 3 shows a mould that is part of the assembly of the present invention.

With reference to FIG. 3, mould 20 comprises, as previously stated, a cylindrical container 21 wherein the polymer precursor will be formed into the core preform, and a set of spaced hole-generating elements 23, defined by wires, rods or tubes crossing longitudinally the container 21, for defining the internal structure of the core preform. This internal structure of the preform will correspond to the internal microstructure of the final fibre, and the hole-generating elements, therefore, will also be referred to as microstructure-generating elements.

Container 21 further comprises a cylindrical lateral wall 26 having a central axis 29, and a first and a second cover 22 and 25—lower and upper, respectively—that fit with the extremities of the lateral wall 26 and can be coupled therewith by appropriated means (not shown), for example tie rods and nuts, screw caps or flanged connections. Sealing members 27 may be interposed between the lateral wall 26 and the covers 22, 25, in order to avoid fluids to come in from the environment and/or the reaction mixture to leak out. The choice of the diameter of container 21 and hole-generating elements 23 is based on practical considerations of easy handling and processing.

The lateral wall 26 may be a tubular member made of glass, plastic, or metal. Covers 22, 25 may be disk-like members made of plastic or metal. Upper cover 25 preferably has a plurality of passing holes 24b. Lower cover 22 may have a plurality of recesses or passing holes 24a arranged with the same pattern as holes 24b. In place of lower cover 22 there may be a base wall integral with lateral wall, so as to form a one-piece cup-shaped container. Covers 22, 25 shall be coupled to lateral wall 26 so that the holes 24b of cover 25 are aligned with holes 24a of cover 22. Means may be provided for easily allowing this alignment, like reference signs or coupling by pins. Preferably, upper cover 25 and lower cover 22 are relatively thick, so that holes 24a and 24b can provide a guiding function for the microstructure-generating elements 23.

In place of upper and/or lower cover 22, 25 there may be one or two bases that are operatively arranged at or close to the ends of container 21, each base having a plurality of passing holes 24a, 24b and providing the function of supporting, and possibly tensioning, the hole generating elements 23; in this embodiment one or two corresponding covers can be further provided, externally to container with respect to the upper base and/or the lower base 21, to seal the container with respect to the outside environment.

Microstructure-generating elements 23 are preferably wires, rods or tubes passing through the plurality of holes 24a and 24b on the respective lower and upper cover and extending coaxially to axis 29 inside container 21. Microstructure-generating elements 23 should have dimensions and rigidity that allow easy handling and easy mould assembly. They may be identical cylindrical members or may be of different sizes and shapes and of different materials.

Microstructure-generating elements 23, if required, may be hold straight and in tension by some appropriate means: for example one end thereof can be fixed, and the other one clamped and tensioned with a weight or some mechanical device.

The materials of microstructure-generating elements 23 should be such that they are not damaged by the monomer, polymerisation process and, for those elements designed to be extracted from container 21 as herein below described, such that they do not cause damage during the extraction operation.

Preferably, the microstructure-generating elements 23 are made of metal, plastic or glass.

The material is preferably chosen also in accordance with the size of the holes that have to be formed; the choice of the material will moreover be linked to the technique for removing the elements 23 from the container 21, if their removal is needed. For example, for holes of relatively small dimensions (up to about 2 mm), elements 23 are preferably metallic wires, to be extracted after heating. Differently, in the case of holes of relatively large cross-section (greater than 1 mm), elements 23 are preferably rigid elements coated with a non-adhesive substance like PTFE, which can be pulled out by applying some kind of mechanical load, at room temperature.

If a metal including iron is used for the microstructure generating elements, Applicants have found that it is advantageous to clean them, during mould assembly, by a solution including NaOH, to remove from the surface of the elements unbound iron ions that might otherwise diffuse in the polymer precursor and detrimentally affect polymerisation. In particular, Applicant has found advantageous to repeatedly clean stainless steel microstructure-generating elements by a cloth soaked in a NaOH solution (0.5 N). Further cleaning can be achieved by a cloth soaked in ethyl alcohol.

Alternatively (and less preferably) to mechanical extraction techniques, chemical removal techniques can be used. Accordingly, elements 23 may be made of a dissolvable, soluble or low melting point substance. For example, elements may be made of a polymer or paraffin that can be removed by use of a selective solvent or by melting with a bland thermal treatment.

One or more elements of the set of elements 23 may be designed to remain embedded in the preform so as to become a structural element of the preform and, then, a micro-structural element of the fibre. The function of these elements can be optical or mechanical. For example, to produce fibre 1" of FIG. 1c, the central microstructure-generating element is designed to remain embedded in the polymer structure so as to form the central structural element 7. The elements designed to remain embedded in the preform will be made of predetermined material that is different from the bulk material of the preform. The arrangement and the dimension of microstructure-generating elements 23 shall be chosen so as to obtain a predetermined spatial distribution and size of holes in the fibre to be manufactured. In particular, the ratio between the diameter of elements 23 and their reciprocal distance shall substantially correspond to the predetermined ratio d/Λ between the diameter d of the holes 5 in the final fibre (more in general, of the microstructural elements in the cladding region) and their periodicity Λ. It is remarked here that the ratio d/Λ in the preform may slightly differ from the ratio d/Λ in the final fibre, due to surface forces and possible pressure difference between the holes and the external of the fibre, during fibre drawing. This effect, that will be further described in the following, can be measured experimentally and can be controlled, to a certain extent, by selecting the fibre drawing operating parameters. Moreover, this effect can be taken into account and compensated during the preform design stage.

Differently, the ratio between the diameter of elements 23 and the internal diameter of container 21 shall not correspond, in general, to the ratio d/D between the diameter d of the holes and the external diameter D of the final fibre, and can be chosen according to requirements of easy handling and processing. In particular, too little dimensions and spacing of the holes make it very difficult to assemble the mould and to extract from it the hole-generating elements, whereas a too large mould diameter complicates preform post-processing and is likely to cause inhomogeneity in the consolidated core preform.

It is evident that a mould as previously described allows for total freedom in the design of the microstructure, and does not generate the undesired interfaces typical in the stack-and-draw method. Moreover, it can be accurately cleaned and isolated from external ambient, so as to reduce causes of optical scattering. As a further advantage, the assembly of the mould is much easier and faster than the stacking of canes, and it requires much less elements. Also, fixing the hole generating elements to both a first and second base, located towards opposite ends of the mould, allows a precise and stable positioning of the hole generating elements and a precise location of the holes throughout the length of the optical preform.

Figure 4A:
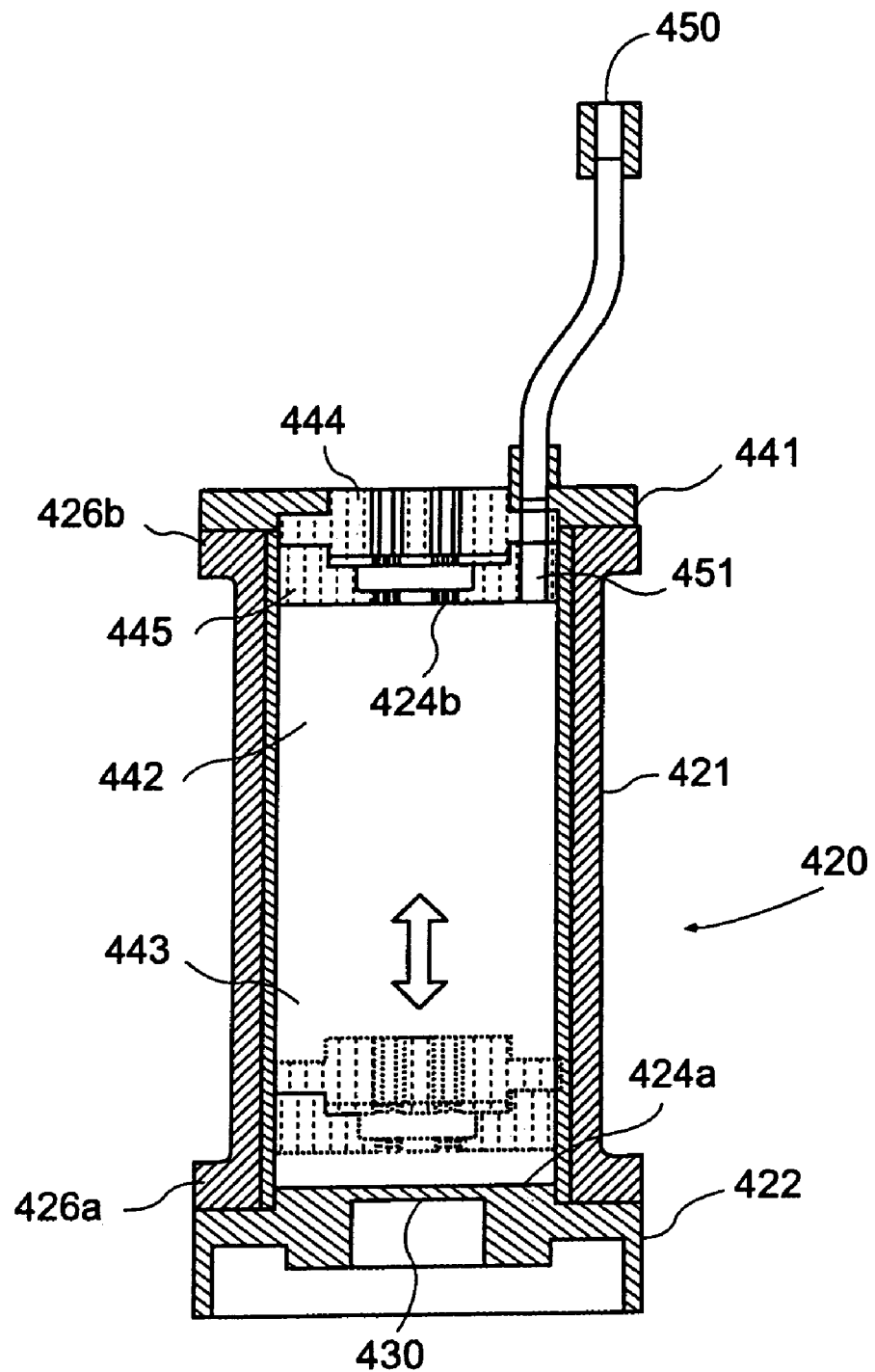
FIGS. 4a, 4b shows a vertical section of another exemplary mould that is part of the assembly of the present invention and, respectively, a plan view of a cover element for this mould.
Figure 4B:
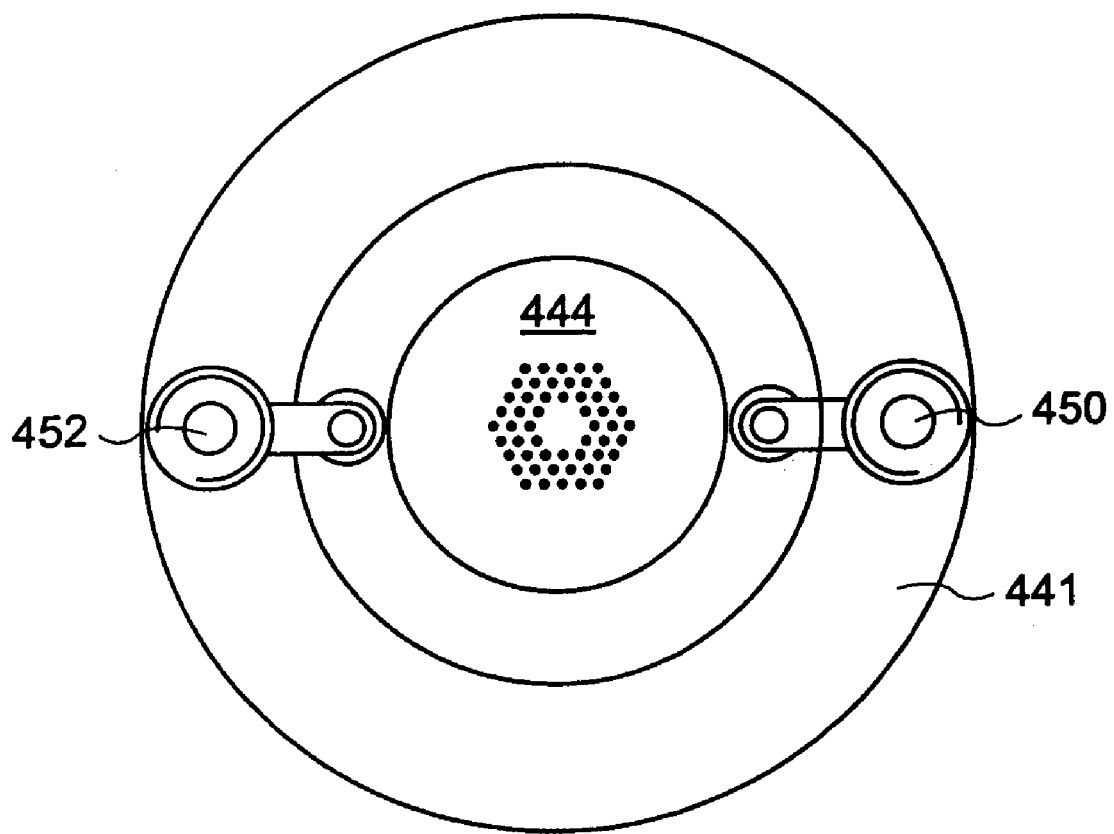

Another embodiment of a mould 420 adapted for use with the present invention is shown in FIGS. 4a and 4b, respectively in a cross sectional view, cut along the mould central axis, and in a view from the above. Mould 420 comprises a cylindrical container 421 provided with upper and lower flanged terminations, 426b and 426a. A lower cover 422 is shaped so as to match the lower flanged termination 426a of cylindrical container 421. A seal is preferably provided between lower cover 422 and lower flanged termination 426a, for example an O-ring seal. The mould is generally made of metal, preferably aluminium; the internal part of the mould can be lined by a tetrafluoroethylene tube, in order to facilitate the extraction of the preform because of reduced friction forces and obtain a smoother surface of the preform.

Passing holes 424a are provided in a central portion 430 of lower cover 422, at positions corresponding to the desired pattern of holes for the preform. The diameter of holes 424a is chosen so as to closely match the diameter of the hole generating elements (not shown) that are to be used in the mould. The thickness of central portion 430 of lower cover 422 may be conveniently smaller than the thickness of an annular region of the lower cover surrounding central portion 430, so as to provide a recess in the side surface of lower cover 422 facing towards the outside of container 421. This recess can be exploited to lodge the terminal portions of the hole generating elements and their fixing means, and to isolate the interior of the mould from the external ambient, for example by filling the recess by means of a thermoset resin potting.

An upper cover of the mould includes an annular portion 441, that is shaped so as to match the upper flanged termination 426b of cylindrical container 421. A seal is preferably provided between annular portion 441 and upper flanged termination 426b, for example an O-ring seal.

The upper cover of the mould also includes a movable portion 442, of generally cylindrical shape and having an outside diameter matching the internal diameter of cylindrical container 426, so as to be movable within cylindrical container 421 between a lower position 443, adjacent to lower cover 422, and an upper position. In the upper position, a recessed upper part of movable portion 442 engages the internal part of annular portion 441 so as to form a substantial seal.

Movable portion 442 includes two parts, base 445 and upper part 444, each provided with holes 424b, having characteristics and positions corresponding to those of holes 424a of lower cover 422. The holes 424b in the base 445 have length and diameter equal to holes 424a and the same function of guidance for the hole-generating elements, whereas holes in the upper part 444 have larger diameter, and are designed to host little springs employed for the tensioning of the hole-generating elements, as described in the following.

A pipe 450 is provided to allow the insertion of a fluid polymer compound. Pipe 450 is connected, for example, to annular portion 441. A passage 451 is provided through movable portion 442 to put pipe 450 in fluid communication with the inside of container 421. A further pipe 452, shown in FIG. 4b but not in FIG. 4a, may be connected to the upper cover, for circulation of a cleaning fluid, and for vacuum and gas conditioning. Alternatively, pipe 452 may be connected to the lower cover or to another part of the mould 420.

The assembly of mould 420 includes moving movable portion 442 to its lower position 443, so as to align holes 424a and 424b, inserting hole generating elements through holes 424a and 424b, fixing the hole generating elements to lower cover 422, moving movable portion 442 to its upper position, fixing it so as to put the hole generating elements under tension. Insertion of hole generating elements in the mould is made easy with this embodiment. Indeed, the short distance between the lower and upper cover during the insertion of hole generating elements reduces the risk of damaging the elements themselves and removes the possibility of entwining the hole generating elements.

In order to put the hole generating elements under tension, springs inserted in the holes 424b of the upper part 444 can be employed. The upper edge of the hole generating elements is inserted into spherical or cylindrical beads, which are fixed to the hole generating elements in a position so as to put the springs in compression. When released, the springs tend to return to their uncompressed position, so pulling the hole-generating elements which result therefore tensioned.

The materials for the core preform can be, for example, those commonly employed in the production of plastic optical fibres, e.g. polymethylmethacrylate, fluorinated polymethylmethacrylate, polystyrene, polycarbonate, aliphatic cyclo-polyolefins, or perfluorinated cyclic optical polymers based on perfluorodioxoles or alkenylvinylethers, like, for example, Cytop (Asahi Glass) and Teflon AF (Dupont). More generally, any transparent amorphous polymeric material can be employed, for example polyvinyl chloride, polyvinylidene fluoride, polyacrylonitrile, styrene-acrylonitrile copolymer (SAN). They can be obtained by addition or condensation polymerisation and can be homopolymers or copolymers. Other materials may be used, provided they have characteristics adapted for use in optical fibres, in particular low optical loss at the wavelengths of expected use, thermal and mechanical properties suitable to withstand the drawing process and subsequent handling of the fibre, chemical resistance, and so on. The density of the material of the core preform is in general greater than 0.8 g/cm$^3$. The corresponding monomer or monomers can be mixed with initiators, chain-transfer agents, catalysts, or other substances. The monomer mixture is required to be optically pure, in order to avoid defects that can increase attenuation loss and, for the same reasons, the reaction environment should be substantially clean and dust-free.

In order to improve the optical transparency of the preform, careful dust removal from the mould is advisable. This can be achieved by isolating the assembled mould from the outside, in such a way that it is no longer exposed to environmental contamination, and recirculating through it a liquid, which is filtered through a 0.2 micron membrane filter prior to injection, at every cycle. Any liquid ordinarily used for cleaning laboratory glass-ware can be used, including distilled or deionized water, volatile solvents, like acetone or ethyl alcohol, and more generally liquids that do not damage the materials of the mould and do not leave traces on them. The cleaning process can be completed, for example, when no scattering centre can be detected by visual inspection in the liquid inside the mould, with the aid of a laser pointer. In practice, the cleaning process can be completed after recirculating the liquid a sufficient number of times, for example after recirculating a volume of liquid corresponding to 10 times the volume of the mould. Finally, the liquid is pumped out, and traces are removed by flushing with a dry and filtered gas. Also for the gas, filtering through a 0.2 micron membrane filter is recommended. Inert gases like nitrogen, or even oil free air from a membrane compressor, are indicated.

It is remarked that this recirculating and filtering technique is particularly advantageous in comparison with the simple filtering of the polymer precursor before its insertion in the mould. In particular, the technique proposed by the Applicant is effective in removing dust particles that enter the mould during its assembly or that are attached to the hole-generating elements. We also remark that this recirculating and filtering technique can be used, in general, to clean a preform mould for making an optical fibre preform, so it is not limited to the production of a polymer preform or of a preform for a microstructured fibre. Examples of other applications include cleaning the mould for a preform of a microstructured glass fibre produced by the sol-gel technique, or of an ordinary (non microstructured) polymer or glass (sol-gel) fibre.

Subsequently, the mould is filled with the monomer mixture, for example by injecting it with a syringe or pumping it with a dosing pump through a filter on the entrance fitting on the tube or the cover. After that the mixture has been introduced into the mould, the entrance fitting is closed with a stopper or a valve, or it can be sealed, for example by heat welding. Also, the mixture can be injected into the closed mould with a needle passing through a porous septum.

In most cases, the mixture in the mould requires degassing, to avoid bubble formation during polymerisation, and often the reaction takes place in vacuum. Therefore, the mould can be connected to a vacuum pump or other systems to create the right pressure conditions inside, by means of the same fitting used for inserting the mixture, or another appositely dedicated.

Generally the reaction does not take place at room temperature, so the mould has to be conditioned at the correct temperature, for example by means of a water or oil thermostatic bath or air oven. In some cases, special illumination conditions are to be provided, such as dark environment or UV radiation.

In general, in order to obtain a polymer with appropriate characteristics, e.g. in terms of molecular weight and molecular weight distribution, and free of defects such as macro- and micro-bubbles, the recipe and specific temperature, pressure, and illumination conditions can be optimised for the specific material and core preform dimensions, according to techniques that are known to the skilled in the art.

The method of the invention is particularly suitable to polymerisation of a liquid monomer, but is not limited to that. Indeed, the only requirement for the material is that it is a fluid optical polymer material or polymer precursor, such that it takes the shape of the mould where it is introduced. Examples of possible fluid polymer precursors are a liquid monomer or other pre-polymer, examples of possible fluid polymer material are a molten polymer, a polymer dissolved in a solvent or a finely powdered polymer.

Correspondingly, consolidation of the fluid optical polymer material or polymer precursor can take place by polymerisation with or without crosslinking, simple cooling, solvent removal, or sintering.

When the reaction has terminated, the polymerised solid core preform is removed from the mould. In some embodiments of the present invention, the hole generating elements remain embedded in the core preform; they can be hollow tubes of the same polymer as the preform bulk, or made of a material of different refractive index, in general another polymer.

In other embodiments, the hole generating elements are extracted from the core preform. In general, this is simply accomplished by applying a tensile load on the elements, after fixing the preform in some way, at room temperature. The force applied must exceed the friction forces acting on the element, consisting in compressive forces generated by material contraction due to cooling and polymerisation, and adhesive forces due to chemical affinity or roughness of the hole generating elements.

However, especially when the diameter of the hole generating elements is very small, which is often the case if low d/D ratios are desired, the force necessary to overcome friction forces may be so high as to break the element; in other cases, the yield strength of the preform material is so low that the reaction forces can provoke local deformation on the core preform.

In order to solve this problem, friction forces acting on the hole generating elements have to be reduced. This can be done, in some cases, by coating the elements with some low-adhesion substance like a low-adhesion fluororesin, e.g., polytetrafluoroethylene. Another way is to heat the preform near to its glass transition temperature $T_g$, so as to increase material compliance and exploit the thermal expansion differences. However, heating reduces also the yield resistance of the preform material, increasing the possibility of local deformation due to the reaction forces.

A preferred solution is to heat the preform material only locally at the interface with the hole generating elements. If the element is made of an electrically conductive material, for example a metallic wire, a current can be generated in the element by applying a potential difference, so that the local heating caused by Joule effect softens the element/polymer interface, reducing the extraction forces significantly.

A hole generating element can be a metallic wire of a material having sufficient tensile resistance under heated conditions. Furthermore, to make the wires less prone to damages as a consequence of their handling during the mould assembly stage, in particular to avoid deviations from straightness, the wires have preferably a substantial stiffness. An appropriate material having both the above characteristics is, for example, stainless steel. Other options are possible, for example titanium. Ni—Cr is very heat resistant, but also very ductile; accordingly, it can be advantageously used if the mould, assembly stage is automated in a way that no substantial risk of wire bending arises, for example as in the mould of FIG. 4.

The Applicant has determined that, in order to implement extraction of the hole generating elements by heating via flow of an electric current through them, the diameter of the hole generating elements is advantageously smaller than 2 mm, to allow the formation of relatively small holes and achieve low d/Λ ratios. Preferably the hole generating elements have a diameter smaller than 1 mm. The diameter of the hole generating elements is advantageously greater than 0.1 mm, to achieve a sufficient resistance to pulling, and preferably greater than 0.3 mm.

The intensity and duration of the electric current to be passed through the hole generating elements can be easily determined in each specific case on the basis of trial and error, depending on the cross section size, electrical resistivity, length and maximum applicable load of the hole generating elements, and material viscosity. Applicants have determined that heating the wires up to a temperature of about 300° C. does not damage the internal surface of the holes. Relatively higher temperatures tend to degrade a thin layer of polymer close to the wire surface. However Applicant has observed that a thin layer of polymer, including the damaged layer, adheres to the wire and is pulled out of the preform together with the wire, leaving a clean and smooth surface at the interior of the holes. Higher temperatures have moreover the advantage that they lower the viscosity of the polymer at the interface with the hole generating elements, and this can simplify extraction of the latter.

It might happen that some monomer remains dissolved within the core preform, due to an incomplete polymerisation process or to depolymerisation occurred during element extraction by heating. The entrapped monomer can cause bubble formation during the subsequent steps of fibre production. In this case, a post-treatment of the core preform, such as thermal annealing and a vacuum treatment over the glass-transition temperature, is beneficial. Preferably the vacuum treatment is carried out at a temperature higher that the glass transition temperature $T_g$. A preferred vacuum condition corresponds to a pressure lower than 0.2 bar, more preferably lower than 0.1 bar. The vacuum treatment is carried out for a time sufficient for substantially removing from the preform the entrapped monomer. A typical duration for the vacuum treatment varies between 4 and 24 hours.

As mentioned before, in general it is convenient to follow a multi-step procedure, in which the preliminary core preform, which does not present the correct dimensional ratio, is stretched to a narrower dimension and new material is added all around it (as shown in FIGS. 6g to 6l), in such a way that the final ratio d/D is the correct one. In general one or two stretching steps are sufficient to reach the required dimensional ratio, though in principle a greater number of steps can be applied for obtaining the required structure.

In general, the desired diameter reduction is of considerable extent (2–10 times), which of course must be maintained also after removal of the stretching load; it is therefore necessary that the core preform deformation be essentially plastic and viscoelastic, and its purely elastic component negligible. The applied load must be higher than the yield point of the material.

Since the majority of optical materials are amorphous and relatively brittle, stretching cannot be performed at room temperature, but it is necessary to heat the core preform up to a temperature whereat ductile behaviour is predominant, that is, over the glass transition temperature of the material.

Stretching of the core preform can be made through conventional drawing in a furnace, but normally it is preferable to stretch the preform with a specifically designed device. In general terms the machine for preform stretching is based on a loading device able to apply a tensional load to the core preform, which is clamped to a fixed rigid structure, and on a heating device for conditioning the preform at the needed temperature. It is advisable that the stretching velocity be controlled, in order to obtain the desired diameter with a good approximation. Preferably the preform is oriented in a vertical direction during its stretching, to avoid bending due to gravity.

The heating device can be a circulating air or radiation oven, while direct flame heating is to be avoided with plastic materials. In general, stretching is performed at a temperature higher than the glass transition temperature $T_g$ but lower than the drawing temperature of the polymer, in order to reduce the risk of damaging the holes and allow for successive calibration of the stretched rod. The whole preform or only a part of it can be heated; the latter solution is to be preferred, because it makes clamping much easier and results in better diameter control. In case of local heating, the heating device can move along the preform with controlled velocity, which produces a cylindrical stretched preform.

Figure 5:
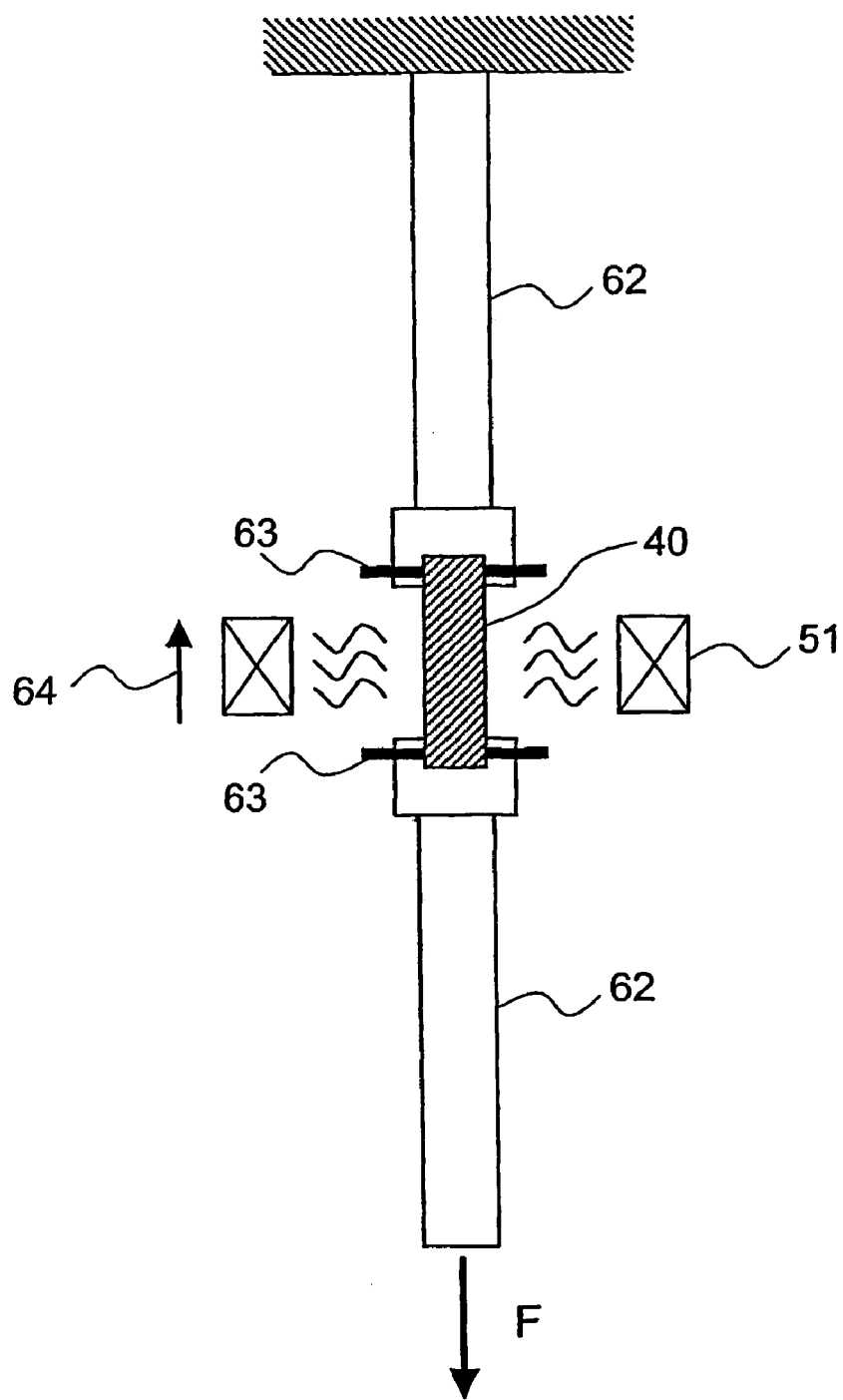
FIG. 5 illustrates a stretching device that is part of the assembly of the present invention.

An example of a stretching device that can be used with the present invention is schematically shown in FIG. 5. It includes two rigid rods 62, for example of steel. The upper rod is clamped to a fixed rigid support structure. A preform 40 is fixed to the upper and lower rod by pins 63. When in use, a load F is applied to the lower rod. A heating device 51 is adapted to heat a portion of the preform. The heating device can be controllably moved along the preform, as shown in FIG. 5 by arrow 64.

The stretching process can produce several stretched preforms from a single core preform, with reduced amount of scrap.

In many cases it is possible to exploit the shape-memory properties of the material employed for subsequent calibration of the stretched preforms. As a matter of fact, due to their viscoelastic nature, polymers can be drawn at temperatures whereat their viscoelastic properties are not negligible, due to molecular orientation, though the plastic behaviour is predominant. If the material is subsequently quenched under the glass transition temperature, the oriented molecules, and consequent internal stresses, remain frozen in the material; new heating over the glass transition temperature releases these stresses, with the consequence that the material tends to return to its previous shape.

This peculiar behaviour was indeed observed on stretched core preforms in PMMA, which upon subsequent heating tended to reduce their length and increase their diameter; surprisingly, the phenomenon was enhanced by operating substantially in vacuum, that is at a pressure lower than 0.2 bar.

This viscoelastic behaviour can be exploited for calibrating stretched core preforms to a desired diameter in a step subsequent to stretching, by inserting the stretched preform in a calibrated tube of appropriate internal diameter, and then heating, preferably in vacuum. The rods take the shape of the tube, with a precision in diameter which cannot commonly be obtained with the simple stretching. A subsequent slow cooling removes the residual internal stresses.

In greater detail, when a sample of softened (i.e. at a temperature higher than the glass transition temperature $T_g$) amorphous polymers is subjected to an elongation stress, a deformation of the sample results that is the sum of an elastic term (that is released when the stress ceases to be applied), a permanent plastic (or viscous) term and a viscoelastic term, that is released in a predetermined time after termination of the stress. The greater the viscoelastic term, the greater the length reduction and diameter increase of a sample after termination of the applied stress.

The viscoelastic deformation component can be measured as a percentage of the deformation. In practice, an x % viscoelastic deformation of a sample is defined as a viscoelastic deformation, along the direction where the deforming force is applied, such that its subsequent slow release at a temperature above $T_g$, in a constraintless environment, causes a decrease of x % in the length of the stretched sample along the deformation direction.

Relatively low temperatures and high elongation speeds increase in general the viscoelastic component of deformation. In general, to achieve a same viscoelastic deformation a temperature closer to $T_g$ is needed for low velocity stretching than for a higher velocity stretching.

The Applicant has found that, in practice, for amorphous polymers, such as those that can be used for making optical preforms according to the present invention, a viscoelastic deformation component greater than 10% of the total deformation is sufficient for subsequent preform calibration.

Such a viscoelastic deformation can be achieved by performing the stretching step at a temperature between few degrees above $T_g$ (for example, $T_g+10°$ C., preferably $T_g+20°$ C.) and the drawing temperature. Preferably, the stretching temperature is lower than $T_g+100°$ C.

The stretching step, to achieve preferably a diameter reduction of between 2 and 10 times, is advantageously carried out in a time of between 1 and 100 min.

As mentioned above, the stretching step is followed by a fast cooling to a temperature below $T_g$, to "freeze" a significant viscoelastic deformation in the material for the subsequent calibration step. In order to avoid that the viscoelastic component of deformation releases in the cooling phase, the stretched core preform must be held in tension during cooling down, until temperature is below the glass transition temperature of the material.

In practice, cooling can take place in a time between 5 and 60 min. Exemplary diameter values for the annealing tube are between 2 and 20 mm The choice of the material for the annealing tube is not critical. This material has to be workable so as to achieve a calibrated internal diameter (a precision of the order of 5% is usually sufficient) and has to withstand the annealing temperatures, usually in a range of $T_g+5°$ C. $T_g+25°$ C. In practice appropriate materials are metals, in particular steel.

The Applicant has determined that the annealing step is preferably carried out under substantial vacuum conditions, i.e. at a pressure lower than 0.2 bar, more preferably at a pressure equal to or lower than 0.1 bar.

The annealing at a temperature above $T_g$ is followed by a slow cooling, to ensure stability after the calibration step. Afterwards, the core rod is extracted from the calibration tube after refrigeration, so as to exploit the different thermal expansion coefficients of the calibration tube and the core rod.

The preform production step is continued by sleeving, i.e., by adding new material around the core rod. In one embodiment, the core rod is positioned in the middle of a mould, and new material polymerised around it (FIGS. 6i and 6l). The mould can be a simple tube, similar to the mould used for producing the core preform, closed at its extremities by two covers. The central core rod is maintained in position by means of devices, for example centring rings, which can be located within the tube or machined on the covers. The core rod can be inserted completely in the mould and in this case its edges should be protected, in order to avoid the new material filling the holes; in other cases, the edges are outside the mould, which has to be sealed. In any case, the extremities of the new preform are likely to be cut away at the end of the process.

The material in contact with the core rod may be a monomer induced to polymerise or a prepolymer completing its polymerisation process. The second case is to be preferred when using the same material for the central core rod and the external layer, since the monomer is generally a good solvent for its polymer. A material different from that of the central core rod can also be used for the external layer, for example a material with less stringent transparency characteristics and, hence, cheaper. Indeed a high transparency (low optical loss) is usually required only for the central core rod, that is the portion of the preform from which the core and adjacent optical cladding are generated in the drawn fibre, i.e., the only portions of the fibre cross section where light actually propagates.

In another embodiment of the invention, a hollow cylinder with the required internal and external diameters is used, and the stretched core preform is inserted into it. The hollow cylinder can be easily obtained by polymerisation of the same or other monomer as the core preform, using a tubular mould containing a central rod of appropriate diameter, and closed at its extremities with two covers with centring rings to keep the rod in place. Otherwise, the hollow cylinder can be obtained by extrusion of a polymer, drilling, or in any other suitable way. The stretched core preform can be made of diameter slightly greater than the hollow of the tube, so that it is maintained in position by interference. In this case, expanding the hollow cylinder and/or shrinking the core preform by heating/cooling can facilitate insertion of the stretched core preform. Otherwise, the latter can be glued or sealed to the hollow cylinder by heating or with a solvent. The collapse of the external tube on the core preform can also take place directly during drawing, e.g., by heating the external tube and reducing the gas pressure between the external tube and the stretched core preform.

The preform so obtained can be stretched and sleeved further, one or more times, if needed, until a desired ratio (d/D) is achieved between the size d of the holes in the microstructured portion of the cross section and the fibre diameter D.

The preform can then be drawn to produce a microstructured fibre with some conventional method commonly used for polymer optical fibres, for example a conventional drawing tower (FIG. 6m) for polymer optical fibres such as the one described in "Plastic Optical Fibres—Practical Applications" (ed. J. Marcou, John Wiley & Sons, 1997). In glass microstructured fibres it is known to seal the extremities of the preform, to avoid hole closure during drawing by exploiting the internal pressure of the air inside the holes against surface-tension forces. In the case of the polymer microstructured fibres, the Applicant has observed that, by keeping the holes at atmospheric pressure, they tend to slightly increase in diameter during drawing. This may seem an apparent disadvantage. However, the Applicant has determined that, by sealing the preform extremities and creating a vacuum outside of the preform, the pressure gap, further increased by heating of the air within the holes, can make the holes more uniform and can smoothen their internal surface at the expense of a slight increase in their size. The increase in the hole size can be easily compensated in the design stage of the hole structure. Moreover, the hole size can be controlled by monitoring the pressure gap, i.e., the degree of vacuum outside the preform, during drawing.

EXAMPLES

Example 1

500 ml of commercial methyl methacrylate (MMA) 99% (Sigma-Aldrich) were purified by passing through basic activated alumina powder (Sigma-Aldrich) in a glass column. The treatment removed the inhibitor and other impurities, supplying MMA of purity 99.7%.

The purified MMA was filtered with a 0.45 µm filter and inserted in a glass ampoule; 0.05% by weight of lauroyl peroxide 97% (Sigma-Aldrich) as initiator and 0.43% by weight of 1-decanethiol 96% (Sigma-Aldrich) as chain transfer agent were added. This mixture, freshly prepared or maintained at 4° C. in a refrigerator for a few days, was used for all the subsequent examples.

Example 2

The container was a glass tube of internal diameter 28 mm, and length 250 mm. Two orders of holes, 0.55 mm in diameter, spaced 5.5 mm, were drilled on two aluminium covers, in a regular triangular arrangement around a central missing hole (FIG. 2). Stainless-steel wires of diameter 0.5 mm were inserted into the mould passing through both covers, which were fixed at the extremities of the tube by means of tie rods. The wires were bent at one edge and the other edge was inserted in and fixed to a template frame connected to the upper cover by threaded rods with nuts, which were used to tension the wire assembly. Tetrafluoroethylene seals and rubber o-rings were interposed between the covers and the glass tube, while the outer part of the covers was encapsulated in a polyurethane potting.

The mould so assembled was extensively cleaned from dust by means of a filtered solvent (ethyl alcohol) which was re-circulated through it with a peristaltic pump. The solvent was filtered on-line through a 0.2 µm PTFE membrane filter immediately before entering the mould. The cleaning process was stopped when, by shining a laser pointer through the solvent within the glass tube, no scatterer could be detected by visual inspection. The mould was subsequently emptied and dried with filtered nitrogen, introduced into the mould via a glass fitting welded to the tube, connected to a line for vacuum and gas conditioning.

A nitrogen atmosphere was created in the mould and 150 ml of the MMA mixture of Example 1 was filtered through a 0.2 µm filter and inserted by a syringe into the mould through another glass fitting. The mixture was accurately degassed in vacuum and put in a thermostatic water bath, at the temperature of 42.5° C. After three days, the temperature of the bath was slowly increased (10° C./hr) to 100° C., then the mould was left in oven for 1 hr at 120° C., and then the polymer preform was removed from the mould. Subsequently, the polymer preform was treated in vacuum 12 hours at 130° C., in order to remove all traces of water and residual monomer.

The metallic wires were extracted by local heating of the polymer, by applying to them a current of 6 A for 10 seconds and subsequently imposing a load of about 5 N. Given that the specific resistivity of the stainless steel alloy is 0.8 $\Omega \times mm^2/m$, a Joule effect power of 36 W was dissipated, corresponding to a heat per unit length of 0.34 cal/mm.

After wire extraction, another treatment in vacuum, at a pressure of about 0.1 bar, was carried out for 12 hours at 125° C., in order to remove traces of residual monomer or other decomposition products that could develop during wire extraction. The core preform so obtained was transparent and bubble-free, with the hole pattern clearly defined.

Example 3

With reference to FIG. 5, the core preform 40 was fixed at two steel rods 62 by means of pins 63 inserted into holes drilled at the extremities, and mounted on the stretching machine drafted in the Figure. The core preform 40 was inserted in a tube-shaped oven 51, heated at 190° C. and conditioned at that temperature for 15 min. Stretching was performed by pulling the heated preform from one edge, while the oven moved in the opposite direction: typical conditions were 40 mm/min of pulling speed and 1 mm/min oven speed. Cooling at room temperature, while maintaining the rod in tension, followed. The stretching operation supplied two rods of about 200 mm length and approximated cylindrical shape from one single core preform of 250 mm length. From preform to preform, the diameter varied from 5 to 5.8 mm.

One stretched preform was then inserted in a calibration steel tube of internal diameter 6.1 mm and 150 mm length, and annealed in oven at 125° C. in vacuum (0.1 bar) for 4 hr, followed by a very slow cooling (12 hr) down to room temperature. The treatment produced a cylindrical preform of 6.1 mm constant diameter and 150 mm length. The holes of the core rod substantially maintained the dimensional ratios, reducing to about 100 µm diameter with 1.1 mm spacing.

A tube of PMMA (internal diameter 6 mm, external diameter 28 mm) was obtained by polymerisation of the reaction mixture of Example 1. The mould was the same glass tube as for the core preform, in the centre of which a tetrafluoroethylene-covered stainless-steel rod was inserted and kept in position by centring holes machined onto the two covers.

The stretched core preform was inserted into the tube, overcoming the slight interference by opportune heating and cooling of the parts, so producing a 28 mm diameter preform containing at its centre a triangular array of 100 µm holes spaced 1.1 mm.

The preform was drawn in a conventional POF drawing tower at 220° C., obtaining a fibre of 250 µm diameter, with holes of 0.9 µm, spaced 10 µm.

Example 4

The same mould as in Example 2 was assembled using, instead of steel wires, 0.5 mm plastic wires, made of a 220 µm core of perfluorinated cyclic polymer (Cytop of Asahi Glass), refractive index 1.34, and a PMMA coating, refractive index 1.489. 150 ml of the MMA mixture of Example 1 were filtered, injected in the mould and polymerised with the same procedure as in Example 2.

The obtained core preform with the embedded perfluorinated wires was drawn in a conventional POF drawing tower at 220° C., obtaining a 250 µm fibre with an array of 2 µm diameter regions of lower refractive index, spaced 50 µm.

Example 5

200 cc of 2,2-3,3-tetrafluoropropylmethacrylate (4FMA) (Zentek) were purified and filtered according to the procedure of Example 1, and mixed with 50 cc of MMA.

A reaction mixture was prepared with 0.1% by weight of lauroyl peroxide and 0.15% by weight of 1-decanethiol, and inserted through a 0.2 µm filter into the mould described in Example 2. Polymerisation was performed in the same conditions of Example 2, except for the vacuum treatment, which took place at 100° C. for 12 hours.

The core preform, after wire extraction, was stretched and calibrated with the apparatus of Example 3: conditions were 180° C., 40 mm/min pulling speed, 2 mm/min oven speed, obtaining a 6 mm preform with 100 µm holes. The stretched core preform was inserted in the centre of the reaction tube, and the MMA mixture of Example 1 was polymerised around it as described in Examples 2 and 3.

A 6 mm 4FMA stretched core preform, with a 28 mm PMMA coating was thus produced: adhesion between the two materials was excellent. The preform was drawn in a conventional POF drawing tower, producing a microstructured fibre of diameter 250 µm.

Example 6

A preform for obtaining a Photonic Band Gap fibre was realised by means of the batch polymerisation method described in Example 2. The mould differed from the one described in previous examples in a few respects. It was 80 mm in inner diameter, and contained 54 metallic wires, 1 mm in diameter, disposed along three coaxial hexagonal crowns, with a wire-to-wire distance of 2.5 mm. In the centre of the mould, a tetrafluoroethylene-covered stainless-steel rod, 5 mm in diameter, was fixed. At the end of the polymerisation process, the wires and the rod were extracted, and the preform underwent a thermal treatment under vacuum, as described in Example 2. Finally, the preform was drawn in a conventional POF drawing tower, producing a microstructured fibre of diameter 250 µm. In this fibre, $d/\Lambda=0.4$, and the diameter of the guiding central area was 15.5 µm.

The fibre of the invention can combine single-mode or few-mode behaviour to easiness of connection and handling, thanks to its large effective area and the properties of the plastic material. Thus its use would be particularly advantageous in short-range data-transmission networks, such as FTTH and LAN, where presently multimode polymeric optical fibres (POFS) or glass fibres are employed.

The invention claimed is:

1. A process for forming an intermediate preform for manufacturing a microstructured optical fibre, comprising:
providing a cylindrical mould defining a central axis, said mould comprising a cylindrical container wall, a first base and a removable second base;
arranging within said mould a plurality of hole generating elements, thereby defining internal structural elements of the intermediate preform;
inserting a fluid optical polymer material or polymer precursor in the mould;
consolidating the fluid polymer material or polymer precursor so as to obtain a solid cylindrical polymer body defining the intermediate preform and having embedded the hole generating elements, said hole generating elements being releasably fixed to said first and to said second base and comprising at least one hole generating element removable from said intermediate preform;
releasing said hole generating elements from said first and second base;
removing the second base from the mould;

removing the cylindrical intermediate preform from the mould, together with the therein embedded hole generating elements; and removing said removable hole generating element for forming an elongated hole inside the intermediate preform by applying a load to said removable hole generating element, wherein said removable hole generating element has a diameter greater than 0.1 mm.

2. The process according to claim 1, wherein said removable hole generating element has a diameter between about 2 and 8 mm.

3. The process according to claim 2, further comprising, before inserting said polymer precursor in the mould, coating said removable hole generating element with a low adhesion layer.

4. The process according to claim 3, wherein said low adhesion layer is a tube arranged over the removable hole generating element.

5. The process according to claim 3, wherein said low adhesion layer comprises a low adhesion fluororesin.

6. The process according to claim 1, wherein said removable hole generating element is electrically conductive and said step of removing includes heating said removable hole generating element by flowing an electrical current through it, so as to partially melt a portion of the intermediate preform proximal to the removable hole generating element.

7. The process according to claim 6, wherein said removable hole generating element is a metal wire.

8. The process according to claim 7, wherein said metal wire is made substantially of stainless steel.

9. The process according to claim 8, wherein said removable hole generating element has a diameter between about 0.1 and 2.0 mm.

10. The process according to claim 9, wherein said removable hole generating element has a diameter between about 0.3 and 1.0 mm.

11. The process according to claim 6, further comprising heating said intermediate preform with said elongated hole at a temperature greater than the glass transition temperature $T_g$, at a pressure lower than about 0.2 bar, for a time sufficient to substantially remove the monomer resulting from depolymerisation in said portion of the intermediate preform proximal to the removable hole generating element.

12. The process according to claim 1, wherein said plurality of hole generating elements comprises a plurality of hole generating elements removable from said intermediate preform and wherein the process comprises removing said plurality of removable hole generating elements for forming a predetermined pattern of elongated holes in the intermediate preform.

13. The process according to claim 12, wherein the plurality of removable hole generating elements is, prior to removal of the intermediate preform from the mould, symmetrically arranged around said central axis of the mould.

14. The process according to claim 1, wherein the plurality of hole generating elements comprises one central hole generating element coaxial to said central axis of the mould.

15. The process according to clam 1, further comprising, after arranging within said mould plurality of hole generating elements, isolating the mould from the outside and cleaning the mould by recirculating through it a liquid and filtering said liquid.

16. The process according to claim 1, wherein inserting a fluid optical polymer material or polymer precursor comprises pouring a polymer precursor in the mould and wherein consolidating the polymer compound comprises polymerising the polymer precursor.

17. The process according to claim 16, wherein said polymer precursor is one of a monomer or a prepolymer.

18. The process according to claim 1, wherein inserting a fluid optical polymer material or polymer precursor comprises pouring or injecting a molten polymer in the mould and wherein consolidating the polymer material or polymer precursor comprises cooling the molten polymer so as to solidify the polymer.

19. The process according to claim 1, wherein inserting a fluid optical polymer material or polymer precursor comprises inserting a powdered polymer in the mould and wherein consolidating the polymer material or polymer precursor comprises sintering the powdered polymer.

20. A process for producing a calibrated intermediate polymer preform for manufacturing an optical fibre, comprising:

forming an intermediate polymer preform of elongated shape having an elongation axis, the polymer having a predetermined glass transition temperature $T_g$;

calibrating said intermediate preform, wherein calibrating comprises:

stretching the intermediate preform during a stretching period by heating the preform at a predetermined stretching temperature above $T_g$ and applying a tensional load (F) to the intermediate preform along its elongation axis, so as to cause its straining along the elongation axis, the stretching temperature, the tensional load and the stretching period being selected so as to impress a viscoelastic deformation to the intermediate preform;

cooling the intermediate preform to a temperature below $T_g$ during a cooling period, while maintaining the stretched preform in tension, so as to avoid a substantial release of said viscoelastic deformation;

inserting the intermediate preform in a calibration tube having a cylindrical inner shape; and heating the intermediate polymer preform to a calibration temperature above $T_g$ during a calibration period sufficient to achieve a substantial release of said viscoelastic deformation.

21. The process according to claim 20, wherein heating the intermediate polymer preform to a calibration temperature is performed at a pressure lower than about 0.2 bar.

22. The process according to claim 20, wherein the stretching temperature is between about $T_g+10°$ C. and $T_g+100°$.

23. The process according to claim 20, wherein the stretching period is between about 1 and 100 mm.

24. The process according to claim 20, wherein forming an intermediate polymer preform of elongated shape comprises:

inserting a fluid optical polymer material or polymer precursor in a cylindrical mound;

consolidating the optical polymer material or polymer precursor so as to obtain a cylindrical polymer body defining the intermediate preform; and removing the cylindrical polymer body from the mould.

25. A process for structurally modifying a polymer preform comprising sleeving a calibrated intermediate polymer preform produced according to claim 20 or 24, by applying a plastic member externally to the calibrated intermediate preform so as to obtain a sleeved preform.

26. The process according to claim 25, wherein applying a plastic member externally to the calibrated intermediate preform comprises inserting the intermediate preform in a plastic tubular member.

27. The process according to claim 25, wherein applying a plastic member externally to the calibrated intermediate preform comprises polymerising a fluid optical polymer material or polymer precursor around the calibrated intermediate preform.

28. The process according to claim 25, comprising repeating one or more times the steps of calibrating and sleeving so as to produce a final preform.

29. The process according to claim 25, further comprising drawing the sleeved preform to obtain an optical fibre.

30. The process according to claim 28, further comprising drawing the final preform to obtain an optical fibre.

31. An optical preform made by the process of any one of claims 1, 3, 6, 11, 15, 20, or 24.

32. An optical preform made by the process of claim 25.

33. An optical preform made by the process of claim 28.

34. An optical fibre made by the process of claim 29.

* * * * *

UNITED STATES PATENT AND TRADEMARK OFFICE
CERTIFICATE OF CORRECTION

PATENT NO. : 7,212,716 B2 Page 1 of 1
APPLICATION NO. : 10/511145
DATED : May 1, 2007
INVENTOR(S) : Arimondi et al.

It is certified that error appears in the above-identified patent and that said Letters Patent is hereby corrected as shown below:

Claim 22, column 24, line 47, "$T_g+100°$." should read --$T_g + 100°C$.--.

Claim 23, column 24, line 49, "100 mm." should read --100 min.--.

Signed and Sealed this

Eighteenth Day of December, 2007

JON W. DUDAS
*Director of the United States Patent and Trademark Office*